No. 796,148. PATENTED AUG. 1, 1905.
J. RIENSTRA.
FLOUR HOLDER.
APPLICATION FILED APR. 13, 1904. RENEWED MAY 29, 1905.

2 SHEETS—SHEET 1.

WITNESSES:
R. G. West
Fred Vander Veen

INVENTOR:
Jacob Rienstra
By Lucius C. West.
atty.

No. 796,148. PATENTED AUG. 1, 1905.
J. RIENSTRA.
FLOUR HOLDER.
APPLICATION FILED APR. 13, 1904. RENEWED MAY 29, 1905.
2 SHEETS—SHEET 2.
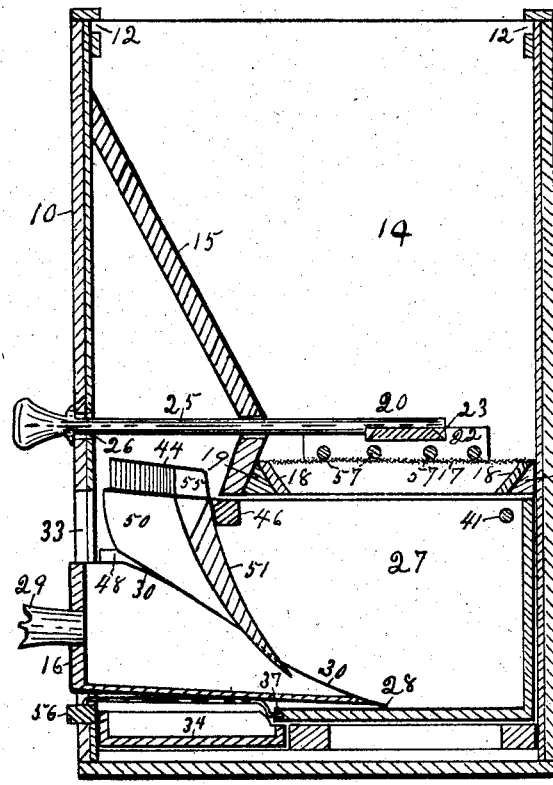
Fig. 5.
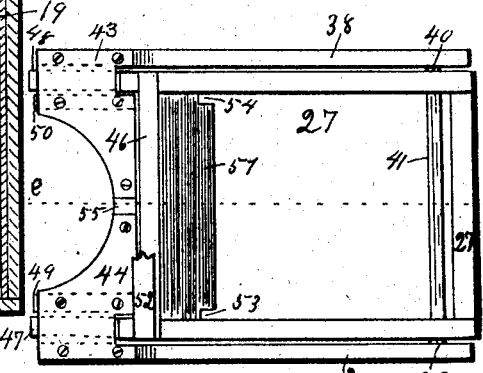
Fig. 6.
Fig. 7.
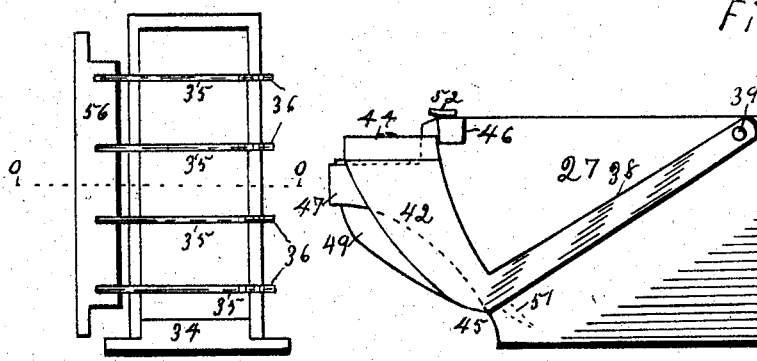
Fig. 8. Fig. 9.
WITNESSES: INVENTOR:
R. G. West. Jacob Rienstra
Fred Vander Veen By Lucius C. West.
atty.

UNITED STATES PATENT OFFICE.

JACOB RIENSTRA, OF KALAMAZOO, MICHIGAN, ASSIGNOR OF ONE-FOURTH TO FRED VANDER VEEN, OF KALAMAZOO, MICHIGAN.

FLOUR-HOLDER.

No. 796,148.          Specification of Letters Patent.          Patented Aug. 1, 1905.

Application filed April 13, 1904. Renewed May 29, 1905. Serial No. 262,903.

*To all whom it may concern:*

Be it known that I, JACOB RIENSTRA, a citizen of the United States, residing at Kalamazoo, in the county of Kalamazoo, State of Michigan, have invented a new and useful Flour-Holder, of which the following is a specification.

This invention particularly relates to devices or cases employed by housewives for holding flour or meal and the like in a manner to be accessible for use more conveniently than if kept in the sack, bag, or chest.

The object of this invention is to provide certain improved features to facilitate the handling and use of the flour or meal and the like to prevent undue scattering and waste; and the object especially consists in the formation of the scoop and an automatically-operating strike, by which means the scoop cannot be withdrawn from the holder by the housewife when using it in a heaped or overloaded condition.

While I term the invention a "flour-holder" for convenience of a name, the device can be used as a display and sale box for holding nuts, grains, seeds, beans, confections, &c., or any purpose for which it may be found suitable.

Figures 1, 2:
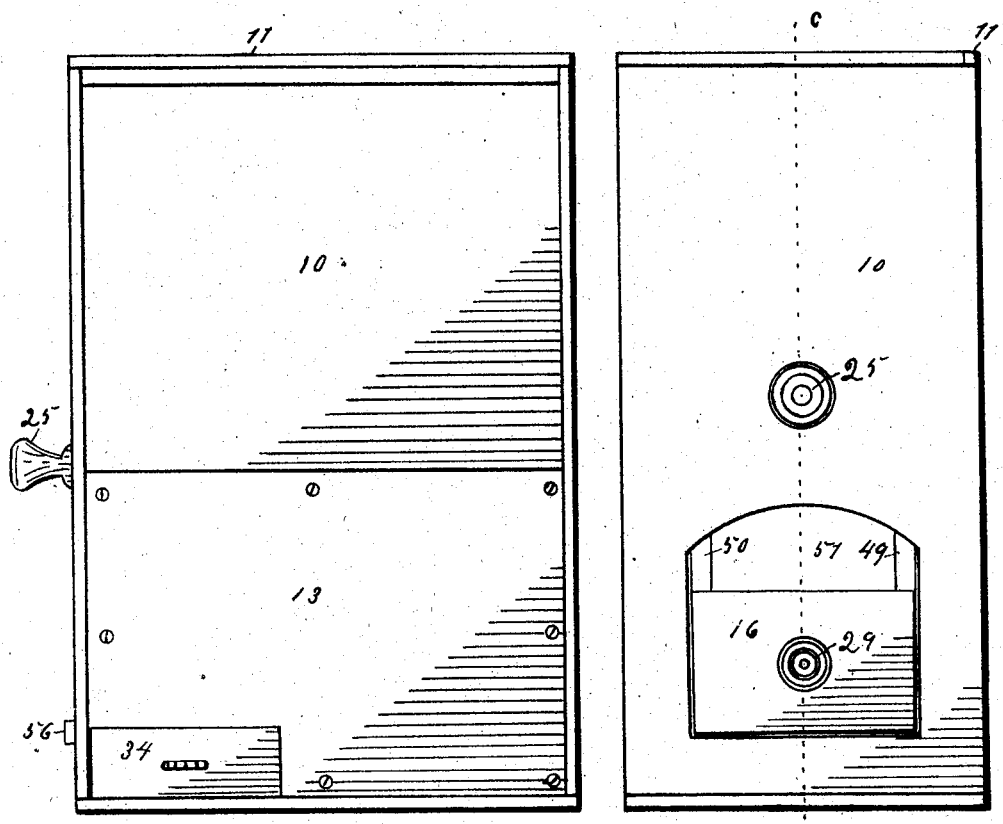
Figure 3:
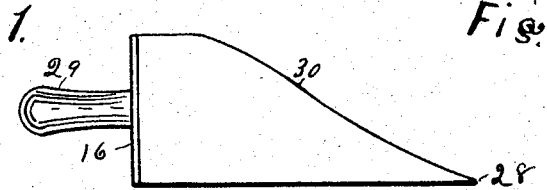
Figure 4:
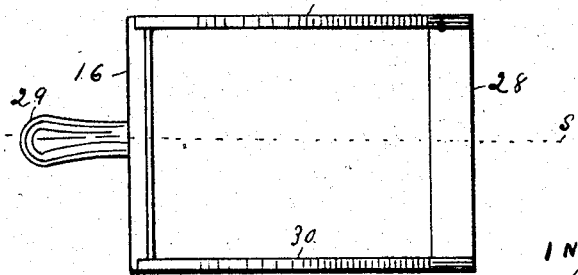

In the accompanying drawings, forming a part of this specification, Figure 1 is a side elevation of the holder looking from a point at the right of Fig. 2; Fig. 2, an end elevation looking from a point from the left of Fig. 1; Fig. 3, a side elevation of the scoop withdrawn from Fig. 2; Fig. 4, a plan of Fig. 3; Fig. 5, a vertical section of Fig. 2 on line *c c* looking from a point at the right and also showing section of parts on line *s s* in Fig. 4, line *v v* in Fig. 6, line *e e* in Fig. 7, and line *o o* in Fig. 8; Fig. 6, a plan of detail from Fig. 5, part broken away; Fig. 7, a plan of Fig. 9; Fig. 8, a plan of detail from Fig. 5, and Fig. 9 is a side elevation of Fig. 7 looking from a point below.

In relation to the parts of the drawings which I have pointed out by numerals, 10 is a box having a cover 11 at the top, which slides in grooves 12, the flour of course being put in at the top, and the box as well has a detachable portion 13 at one side near the bottom for opening to insert the contents of this portion. A flour-bin proper is shown at 14. It has an inclined wall 15 at the front side set to contract the size of the bottom of the bin 14, and thus make space in lower portion of the box at the front side for the scoop 16, Figs. 2, 3, 4, 5.

In the bottom of the flour-bin 14 is a screen 17 to sift the flour down through. This screen is attached on the top of a V-frame 18, which V-frame is detachable in a V-seat 19, Fig. 5. On the screen 17 is a flour-agitator 20, made of two end pieces 21 22, a cross-piece 23, attached at the ends to said end pieces, separated wires 57 on the bottom next to the screen 17 and attached to the end pieces 21 22, and a handle 25, attached to the cross-piece 23 at right angles thereto and extended out through the front wall at 26. By pulling and pushing on the handle 25 the flour is agitated and caused to sift through screen 17 when the housewife desires to use it. This particular agitator is made the subject of a claim in an application for a patent filed by me July 8, 1904, Serial No. 215,738. Immediately below the screen 17 is a tray 27 to receive the flour which comes through the screen. This tray 27 is inserted in place by removing the detachable wall 13. The front wall has a lower opening 33 for the insertion of the scoop 16 when flour is desired, and when this action takes place said scoop 16 enters the end of the tray 27, said end being left open for the purpose when the tray is constructed. The scoop 16 is ordinarily inserted far enough for its edge 28 to reach the right end wall of the tray 27. It is supposed to be thus inserted in Figs. 1 and 2, and for which reason the handle 29 of the scoop does not show in Fig. 1, while in Fig. 5 the scoop is only partly drawn out to illustrate the operation of the strike below described. The sides of the scoop 16 are slanted down at 30 from the rear handled end to the front open end, and said front end at bottom is brought to an edge 28, so as to readily take in the flour in the tray 27 and off from the bottom thereof, Fig. 5.

I have placed between the opening 33 and the tray 27, below the plane of the bottom of said tray, in a recess made for the purpose, what I style a "waste-draw" 34 to catch any contingent waste which might otherwise occur by operating the scoop 16.

Guard-rods 35 are transversely to and just above the waste-draw 34 for the scoop 16 to slide over and not catch against the waste-draw in operating. Figs. 5 and 8 show these guard-rods 35, and their inner ends 36 are attached to the front edge of the bottom of the tray by being inserted into holes at 37, Fig. 5.

In the contrivance for striking off the scoop after being filled with flour I use an elbow 38, one on each side of the tray 27 and pivoted to the rear upper corners thereof at 39 40 by rod 41. The upwardly-extending projections 42 of these elbows 38 are widened and made heavy, and to the top of them is transversely attached a weighted beam 44, in order that normally the elbows will hang, as in Figs. 5, 7, and 9, with their bends 45 nearly on a level with the bottom of the tray 27 and will automatically seek this position even when being raised by the insertion of the scoop, as explained below.

In describing the strike it must here be stated that the tray 27 has a beam transversely at its upper forward corner at 46 and forward extensions 47 48 of its side walls. The upward extension 42 of the elbow 38 is on the outside of extension 47, and the upward extension 43 on the other side of tray 27 is shown dotted through the weighted beam 44 in Fig. 7. Immediately at the inside of each extension 47 48 are pendent weighted blocks 49 50, attached to the weighted beam 44, and to the edge of which blocks is attached the pendent bowed strike 51 in position to rest on the slanting edges 30 of the scoop 16 while being inserted and withdrawn and during which time the elbows 38 rise and fall, swinging on their pivots 39 40. The weight capacity of the upward projections 42 43 of the elbows, the blocks 49 50, and weighted beam 44 are here all combined to effect the desired result—that is, the design is that 42 43 49 50 44 are individually a weight; but the weight may be produced in any practical way. For instance, the weighted beam 44 may be heavy enough and even made of metal, if desired.

The strike 51 prevents any flour coming out of the front opening of the tray 27 except what goes into the scoop 16, and as the latter is moved inward and outward the surface of the strike plays close to the front side of the beam 46, and this beam may be provided with a brush, which a broken strip of leather serves to illustrate at 52 in Figs. 7 and 9.

When the scoop is withdrawn full of flour, it is desirable that the upper slanting edges of the sides of said scoop shall be struck and that the surface of the flour a little below said slanting edges shall be struck off. I have provided for this by making a notch 53 and 54 at the lower corners of the strike 51, which fit loosely on said edges of scoop, and the lower edge of the strike comes a little below the upper surface of said edges on the inside, Figs. 5, 7. The upper edge of the strike 51 and the weighted beam 44 have a central mortise 55 to accommodate the handle 25 of the agitator, and thus permit the strike to rise sufficiently high. By making different dimensions in height of box of course this could be obviated. Returning to the guard-rods 35, I should have stated that, as here shown, the forward ends of said rods are attached to a little strip 56, forming a sort of a threshold to the base of the opening 33.

In the operation, supposing the flour-holder to be attached to the wall near the housewife's work-table, by feeling with the scoop she ascertains if there is any flour in the tray 27. If not, she agitates the agitator with handle 25, causing enough flour to fall through the screen 17, and then pushes in the scoop 16 into the tray 27, which action raises the strike, as before stated. She then withdraws the scoop entirely from the holder, and the strike automatically performs its function, as described, the waste-draw 34 catching any over litter, if there is any. The scoop is left in the holder, as in Fig. 2, when not using flour, and thus said scoop and the strike 51 form a closure to the opening 33, and if any flour is caused to fall through the screen when not needed no harm is done.

Having thus described my invention, what I claim as new, and desire to secure by Letters Patent of the United States of America, is—

1. The holder comprising a bin, a screen in bottom thereof, a tray beneath the screen having open front end, an automatically vertically playing curved strike at open end of tray, and a scoop having the slanting sides, and adapted to enter the open end of said tray and to raise the strike by contact with its lower edge, substantially as set forth.

2. A holder comprising a box, a bin in upper portion thereof and having the front slanting wall contracting the bottom of the bin, a screen in said bottom, an agitator on said screen provided with the handle extended through the front wall of the box, a tray beneath the screen having the open front end, the automatically vertically operative curved pendent strike, having elbows pivoted to the upper rear corners of the tray and the weighted transverse beam, and a scoop having the slanting sides and adapted to raise the strike as it enters the open end of the tray by contact with the lower edge of said strike, substantially as set forth.

3. In a flour-holder, the combination of a tray having the open end, an automatically vertically operative curved strike provided with notches in the lower corners, and a scoop having slanting sides adapted to enter said notches and raise the strike, whereby the edges of said slanting sides and the contents of the scoop are struck when the latter is withdrawn, substantially as set forth.

4. In a holder, the combination of a tray having open front end, a scoop adapted to enter said open end and be withdrawn therefrom, and guard-rods and waste-draw beneath the transit of the bottom of said scoop, substantially as set forth.

5. In a holder, the combination of an automatically and vertically operative strike, curved and provided with the notches in lower corners, and a scoop having sides adapted to contact with under edge of strike when scoop is being inserted in the holder and withdrawn therefrom, whereby the edges of said sides and the contents of the scoop are struck, substantially as set forth.

6. In a holder, the combination of a tray having open front end and transverse beam attached to upper front corners, elbows pivoted to upper rear corners of the tray and having upwardly-extending projections at their forward ends, the weighted beam attached transversely on upper ends of said elbow projections, the curved strike in position to loosely brush the tray-beam when the strike plays vertically, and a scoop having the slanting sides, substantially as set forth.

7. A holder comprising a box having a bin with contracted bottom in upper portion and an opening in the lower portion of its front wall, a screen in the bottom of the bin, an agitator on said screen, a tray beneath the screen having an open end, the automatically vertically playing curved strike at said open end, pivoted to the tray and being weighted, the scoop having slanting sides, and the guard-rods and waste-draw beneath the transit of the bottom of said scoop, substantially as set forth.

In testimony of the foregoing I have hereunto set my hand in the presence of two witnesses.

JACOB RIENSTRA.

Witnesses:
   FRED VANDER VEEN,
   W. M. DE YOE.